United States Patent [19]
Briscoe et al.

[11] Patent Number: 5,005,304
[45] Date of Patent: Apr. 9, 1991

[54] REPLACEABLE WEAR ELEMENT

[75] Inventors: Terry L. Briscoe, Portland; Paul C. Sprunger, Dundee, both of Oreg.

[73] Assignee: ESCO Corporation, Portland, Oreg.

[21] Appl. No.: 478,359

[22] Filed: Feb. 12, 1990

[51] Int. Cl.⁵ .............................................. E02F 9/28
[52] U.S. Cl. ..................................... 37/141 R; 37/135; 403/331; 403/381; 172/751; 172/753; 172/772
[58] Field of Search ................... 403/331, 381; 37/135, 37/141 T, 141 R; 172/719, 749, 751, 753, 772

[56] References Cited

U.S. PATENT DOCUMENTS

| | | | |
|---|---|---|---|
| 3,469,331 | 9/1969 | Wood | 37/141 R |
| 4,058,173 | 11/1977 | Carson | 37/141 R |
| 4,457,380 | 7/1984 | Curry | 37/141 R |
| 4,716,666 | 1/1988 | Potter | 37/135 |

FOREIGN PATENT DOCUMENTS

| | | | |
|---|---|---|---|
| 698695 | 11/1964 | Canada | 37/142 A |
| 275868 | 9/1970 | U.S.S.R. | 37/141 R |

Primary Examiner—Randolph A. Reese
Assistant Examiner—Arlen L. Olsen
Attorney, Agent, or Firm—Tilton, Fallon, Lungmus & Chestnut

[57] ABSTRACT

An assembly of wear elements for installation on the wearable part of a structure engageable with abrasive material including a relatively elongated base element adapted to be secured to the wearable part and a relatively elongated wear element releasably, reversibly mounted on the base element, each of the elements having first and second pair of longitudinally spaced apart dovetail surfaces with one of the elements having third and fourth pairs of longitudinally spaced apart dovetail surfaces.

10 Claims, 3 Drawing Sheets

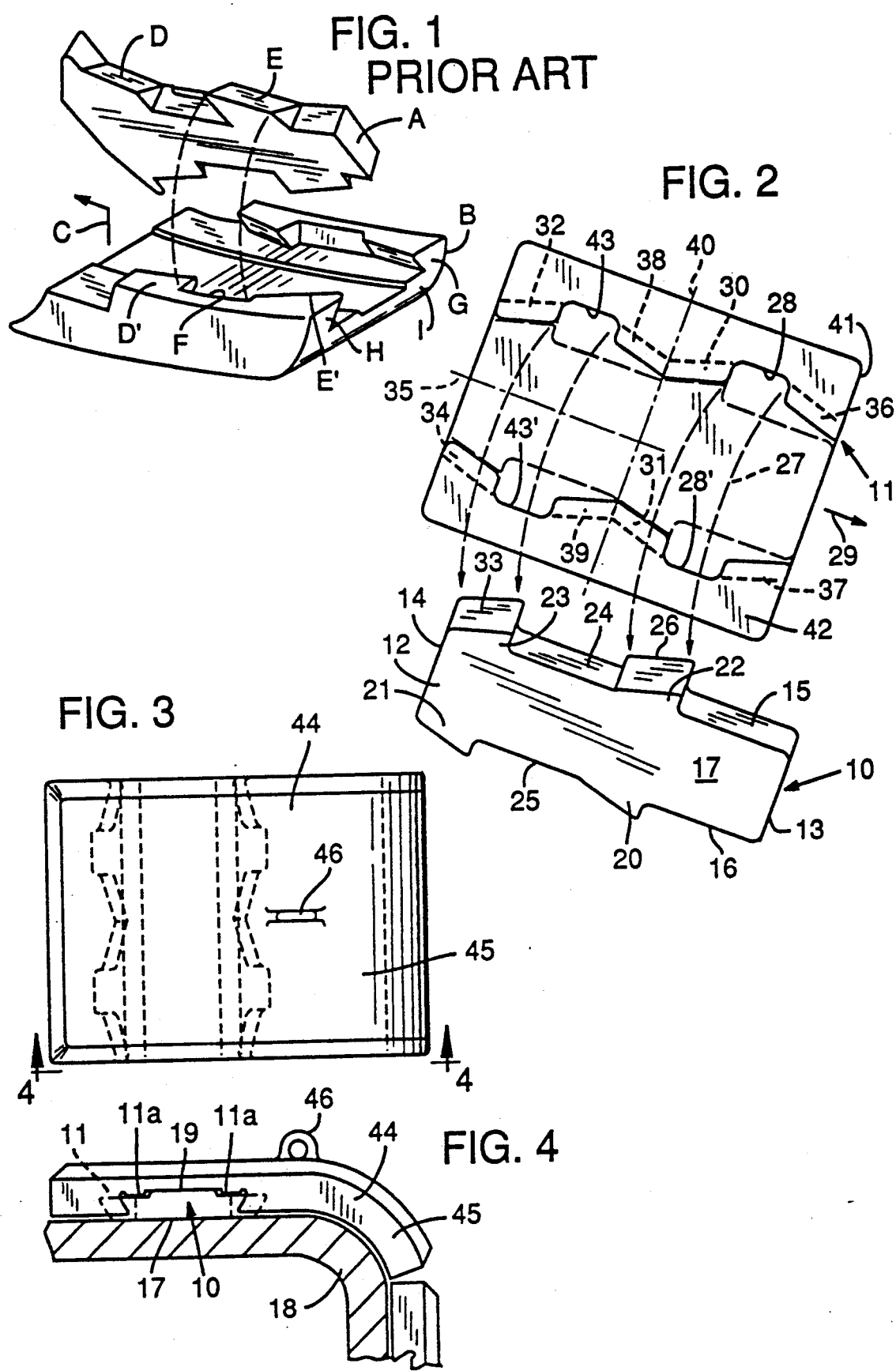

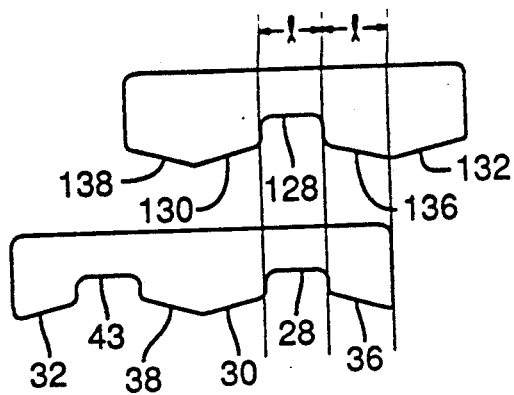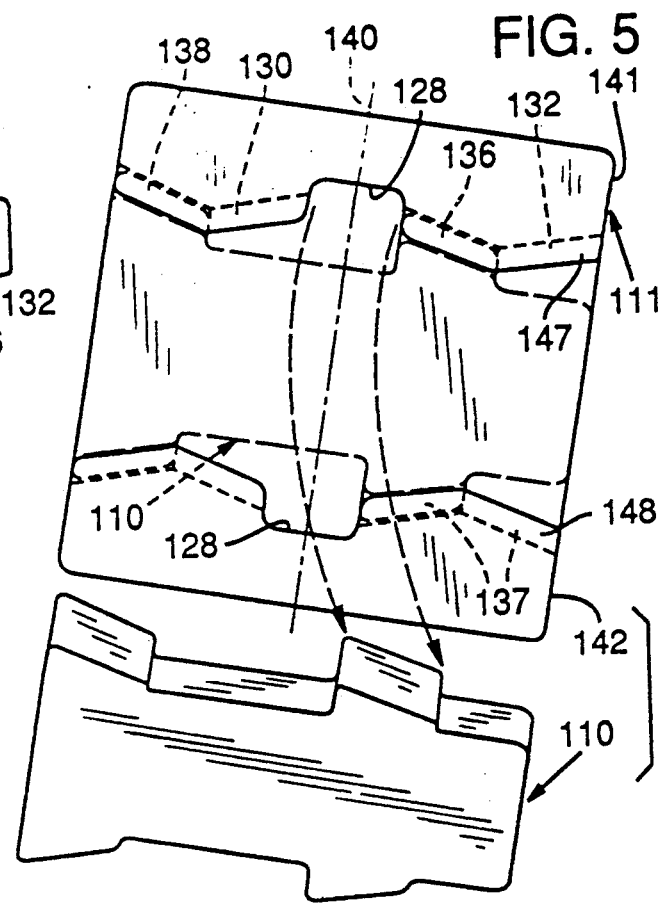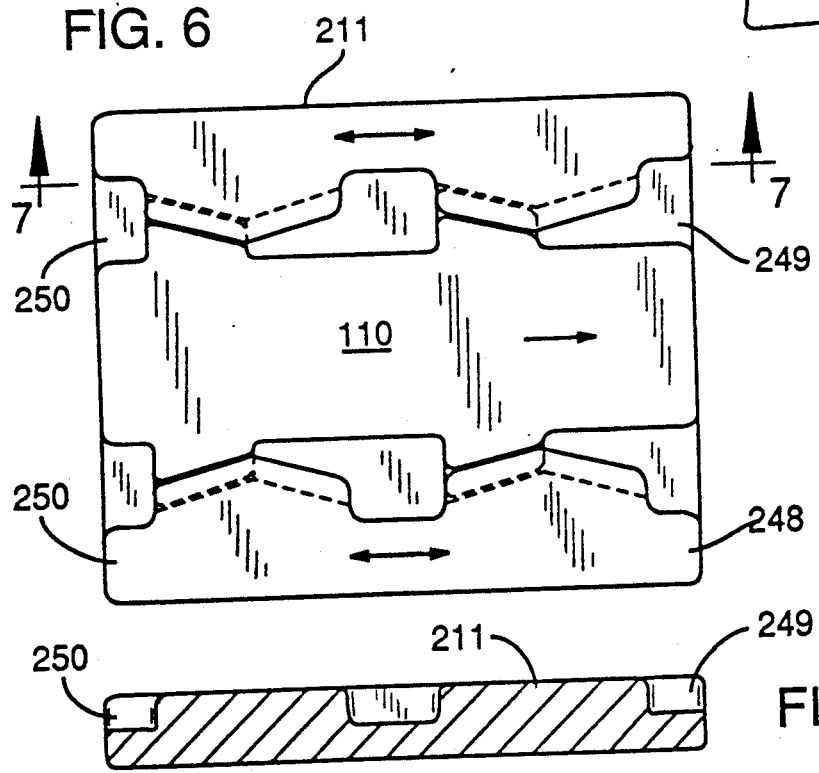

1

REPLACEABLE WEAR ELEMENT

BACKGROUND AND SUMMARY OF INVENTION

This invention relates to a replaceable wear element and, more particularly, an element for installation on the wearable part of a structure engageable with abrasive material.

This invention is an improvement on co-owned U.S. Pat. No. 4,716,666. In that patent, a pair of spaced apart dovetails were employed to provide a readily replaceable wear element—as for the underside of an excavating bucket. The assembly of base and wearable element was intended for installation in only one direction. This has not served the needs of operators in excavating, mining, etc. where reversibility is required.

According to the instant invention, we achieve reversibility through a novel duplication of dovetail surfaces which makes possible the utilization, for example, of a single element where previously two different replacement elements had to be stored. For example, in the case of a bucket, it is advantageous to provide a wear element that wraps around a corner and thus, utilizing the patent teachings, it would be necessary to have both right and left hand styles. Now, through the practice of the invention, only a single, versatile replacement element is needed. This is a matter of some consequence to operators because buckets are usually employed in primitive conditions and storage facilities limited. Thus, anything that reduces the number of parts to be stored is highly desirable.

According to the invention, each of the base and wear elements has first and second pairs of longitudinally spaced apart dovetail surfaces with one of the elements having third and fourth pairs of longitudinally spaced apart dovetail surfaces and with the dovetail surfaces of the third and fourth pairs being interlaced with the dovetail surfaces of the first and second pairs. This permits reversible mounting of the four pair-equipped element on the two pair-equipped element. Additional details of construction and the advantages stemming therefrom can be seen in the ensuing specification.

BRIEF DESCRIPTION OF THE DRAWINGS

The invention is described in conjunction with the accompanying drawing, in which FIG. 1 is a perspective view of the prior art teaching of U.S. Pat. No. 4,716,666;

FIG. 2 is a perspective, exploded view of the elements of the instant invention;

FIG. 3 is a top plan view of the assembly of FIG. 2;

FIG. 4 is a fragmentary side elevational view of the inventive assembly as applied to the corner of a bucket as would be seen along the sight line 4—4 applied to FIG. 3;

FIG. 5 is a perspective, exploded view of a modified form of the invention;

FIG. 5A is a schematic representation of the showings in FIGS. 2 and 5 interrelated to show corresponding dovetail segments;

FIG. 6 is a top plan view of a modified form of the invention seen in FIG. 5;

FIG. 7 is a sectional view seen along the sight line 7—7 applied to FIG. 6;

DETAILED DESCRIPTION

Figure 8:
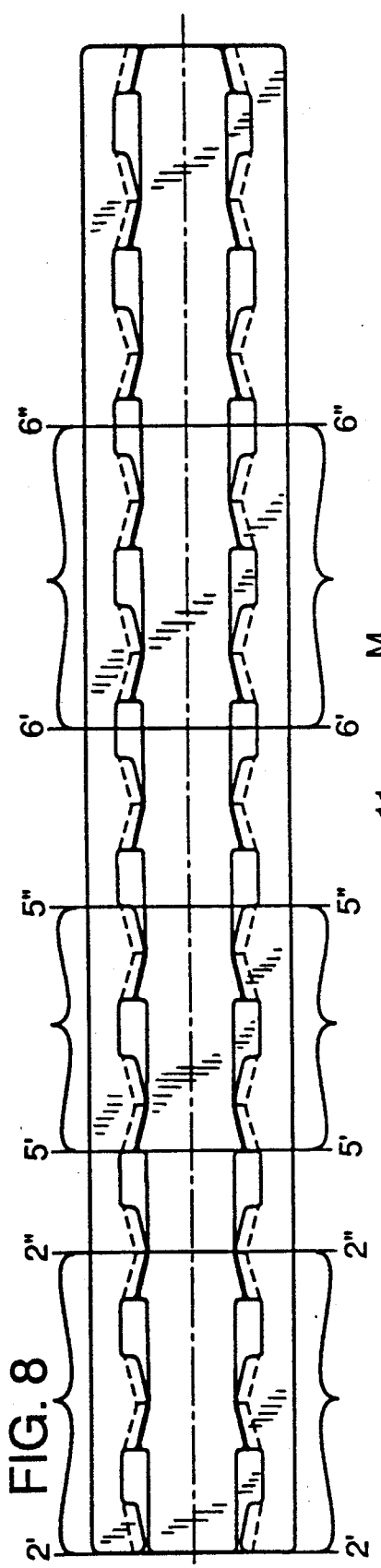
FIG. 8 is a schematic top plan view of a series of wear assemblies to illustrate alternative construction.

In the illustration given and with reference first to FIG. 1 which is entitled PRIOR ART, the symbol A designates the base element as seen in U.S. Pat. No. 4,716,666 and the symbol B designates the wearable element—in this case a runner for the underside of a dragline bucket. The arrow designated C shows the path through which the element B is moved in being installed on the base element A, i.e., it is first moved upwardly into general co-planar relation and thereafter slid rearwardly so as to engage the two pairs of mating dovetails, D and E on element A and D' and E' on element B. The two pairs of dovetail elements are separated by a notch F.

Now referring to FIG. 2 which illustrates the assembly of the instant invention, the numeral 10 designates generally a base element while the numeral 11 designates generally the wearable element. In the illustration given, the base element 10 includes a generally plate-like body 12 which is relatively elongated to provide end walls 13, 14 and sidewalls 15, 16. One body surface 17 is the surface which normally would be secured to the wearable part of a structure (not shown). Such a part, however, could be the corner portion 18 of a bucket—see FIG. 4.

The surface opposite to the attached surface 17 can be seen only in FIG. 4 and is designated 19 and constitutes the surface in confronting relation to the wearable element 11.

Still referring to the base element 10 of FIG. 2, it will be noted that the body is equipped with integral transversely extending flanges as at 20, 21, 22 and 23 separated by relatively longitudinally elongated notches 24 and 25. The extremities of the flanges 20–23 are shaped to provide divergent/convergent dovetail surfaces. In other words, the surfaces are doubly sloped—both in the top to bottom direction of the normal dovetail and also sloped fore/aft to provide the divergence/convergence. The dovetail surfaces employed herein are like those in the previously mentioned co-owned U.S. Pat. No. 4,716,666 and express reference is hereby made to that patent for additional details of structure and operation. Illustrative of the dovetail surfaces is the outer wall or surface 26 of the flange portion 22 in the base element 10 (see the central right hand portion of FIG. 2). When the wear element 11 is moved into engagement with the base element 10—as illustrated by the curved arrows 27 in FIG. 2—the flange 22 is received within the notch 28. Then, when the wear element 11 is moved in the direction of the arrow 29, the dovetail surface 26 engages a mating surface 30 in the wear element 11. Normally, the elements 10, 11 are positioned as seen in FIG. 2 when the normal flow of abrasive material is in the direction of the arrow 29—which tends to seat more firmly the dovetail surfaces 26, 30 against each other. More properly, such movement includes the seating engagement of the dovetail surface 31 (the mirror image of the dovetail surface 30) against the dovetail surface provided at the extremity of the flange 20; and in similar fashion, the dovetail surface 32 on the wear element 11 is seated on the dovetail surface 33 on the flange 23 of the base element 10 and, in like fashion, the dovetail surface 34 is seated against the dovetail at the extremity of the flange 21 on the base element 10. We have found it advantageous to incline the surfaces 30, 31, 32 and 34 at an angle of about 15° relative to the longitudinal center line 35 of the wear element 11. It is to be understood that the mating dovetail surfaces as at 26, 33, etc. on the base element are similarly inclined to the longitudinal center line (not shown) of the base element 10. In some instances, we have found it to be further advantageous to reduce the inclination somewhat (to the range of about 10° to about 15° C.) to insure better fits.

Also assisting in developing better fits are the provision of rails 11A (see FIG. 4) on the surface of the wear element confronting the base element 10. These also can be seen in perspective in FIG. 1 adjacent the outstanding walls G and H and are designated by the symbol I.

The operation described thus far is very much like that achieved through the practice of the invention in U.S. Pat. No. 4,716,666. To obtain the advantageous reversibility of the instant invention, we provide additional dovetail surfaces as at 36, 37 at the right hand end of the wearable element 11 in FIG. 2 and as at 38 and 39 just to the left of the transverse center line 40—again referring to FIG. 2. It will also be noted that the dovetail surfaces are symmetrical about the transverse center line 40 as they also are about the longitudinal center line 35. Therefore, as the wearable element 11 is rotated 180°, it would have the same appearance as that shown in FIG. 2 but with the dovetail surface 39 now being in the place of the dovetail surface 30, the dovetail surface 37 occupying the position of the dovetail surface 32, etc.

The dovetail surfaces in the wear element 11 are provided by outstanding wall portions as at 41 and 42 in a fashion similar to that provided at G and H in FIG. 1 relative to the prior art. More particularly, the surface remote from that being abraded is equipped with transversely-spaced, integral outstanding portions which provide confronting walls carrying the various dovetails. These confronting walls are mirror images and spaced equally away from the longitudinal center line 35. These confronting walls are equipped with two pairs of longitudinally spaced, substantially identical, transversely aligned notches intermediate the ends of the wear element 11. For example, one pair of notches is designated 28, 28' and the other pair 43, 43'.

It will be seen that each notch is flanked at both longitudinal ends thereof by a segment of the opposed or confronting wall providing the same—with each of the flanking segments being convergently related to its longitudinal center line in proceeding away from its associated notch. This is illustrated by considering the dovetail surfaces as the segments referred to in connection with the notch 2 and the center line 35. The same applies to the segments 32, 38 relative to the notch 43, the segments 34, 39 relative to the notch 43' and the segments 31, 37 relative to the notch 28'.

The reversibility of the wear element 11 relative to the base element 10 not only is advantageous in the case of left and right mountings as in FIG. 4 where the body 44 is extended transversely of the length of the dovetail along one sidewall to go around a corner as at 45, but also in the case of wear elements in general. Where the wear elements are flat but subjected to abrasive forces in only one longitudinal direction, wear normally occurs more at the lead portion than the trailing portion. Therefore, switching the wear element end for end effectively extends the life thereof. In the case of the right and left hand elements of the character seen in FIGS. 3 and 4, the reversible feature is especially advantageous because these normally are quite extensive and ponderous, sometimes necessitating an integral eye as at 46 to lift the same into position on the associated bucket 18.

An alternative form of the invention can be seen in FIG. 5 which is advantageously employed where the length of the wear element is a restriction. This is achieved in the wear element 111 of FIG. 5 by the elimination of one pair of notches, utilizing only the notches 128 and 128'. As before in the case of the illustration of FIG. 2, the illustration of FIG. 5 makes use of opposed or confronting walls 147 and 148 which are symmetrically related to the longitudinal center line (not shown). These are provided by upstanding integral portions as at 141 and 142. Further, and again as in the instance of the showing in FIG. 2, the confronting walls 147, 148 are symmetrical about the transverse center line here designated 140. Also, again there are four pairs of dovetail surfaces but here the arrangement is somewhat different. The arrangement of the dovetail surfaces is the same in the respect that flanking the notch 128 are the surfaces 136 and 130 much the same as the surfaces 36 and 30 flank the notch 28 in FIG. 2. Also in proceeding to the left, a further dovetail surface or wall segment 138 extends to the left of the segment 130 just as the surface 38 extends to the left of the surface 30 in FIG. 2. However, the segment 32 of FIG. 2 has been relocated from the left hand end to the right hand end as at 132 in FIG. 5. More particularly, the opposed sidewalls 147 are arranged in two longitudinally spaced pairs separated by a notch in each wall. Each wall of each pair includes two angularly related wall segments with the wall segment immediately adjacent the notch being convergently related to its transversely aligned wall segment (136 versus 137) with the wall segment spaced from the notch being divergently related to its transversely aligned wall segment (132 versus 137).

Common to both constructions is the fact that each notch is flanked at both longitudinal ends by a segment of the confronting wall with each of the flanking segment being convergently related to the longitudinal center line in proceeding away from the associated notch. Further, each confronting wall remote from the notch has two additional segments for cooperation with the flanking segments in reversibly mounting the body on the base element 10, 110. We construct the notches and segments as having approximately the same length with the first of the additional segments being spaced approximately two lengths from a first of the flanking segments and the second of the additional segments being spaced approximately two lengths from the second of the flanking segments with the first flanking and additional segments being parallel and the second and additional segments being parallel.

The foregoing can be appreciated from a consideration of FIG. 5A which is a schematic top plan view of the showings in FIGS. 2 and 5 arranged to show corresponding elements, viz., the notches 28 and 128 being aligned as are the segments 30, 130, the segments 38, 138 and the segments 36, 136. The additional segments previously referred to include the segments 132 and 138 in the case of the schematic view of FIG. 5. The segment 132 cooperates with, i.e., is parallel to, the segment 130 and is spaced two lengths l therefrom. In the same fashion, the additional 138 is related to the flanking segment 136. Thus it will be seen relative to the showing in FIG. 5 that the additional segments are on opposite sides of the notch 128.

Still referring to FIG. 5A and in the case of the schematic representation of FIG. 2, the flanking segments are 36 and 30 with the additional segments being 38 and 32. It will be noted that the segment 38 is spaced two lengths from the segment 36 and is parallel thereto while the segment 32 is spaced two lengths from the segment 30 and again is parallel thereto.

It may be easier to understand the bi-directional dovetail constructions and features by noting that the variations are based on a repetitive pattern as seen in FIG. 8. For instance, one get the base/runner combination of FIG. 2 if the FIG. 8 showing is cut along the section lines 2'—2' and 2"—2". One gets the base/runner combination of FIG. 5 if one cuts at 5'—5' and 5"—5". One gets the base/runner combination of FIG. 6 if one cuts at 6'—6"—6". In all cases one gets a base/runner combination that is reversible. One can choose to cut where necessary to obtain specific objectives such as an assembly with dovetails shifted towards the front, towards the rear, or an assembly that is more compact when individual mounting is permissible (as opposed to serial mounting).

In the case of the embodiment of FIG. 2, it is possible to arrange the wear elements 11 in a continuous series—as in a wear runner for a dragline bucket, a lining for an ore chute, etc. with the end of one wear element abutting the other—and still provide the necessary sliding movement for removal when the same are removed serially.

Figure 9:
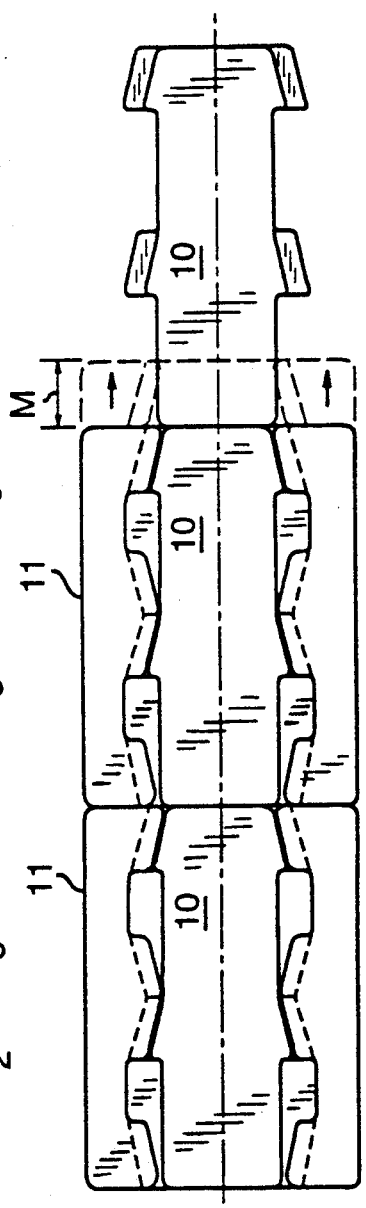
FIG. 9 is a schematic plan view of the construction of FIG. 2, illustrating disassembly.
Figure 9A:
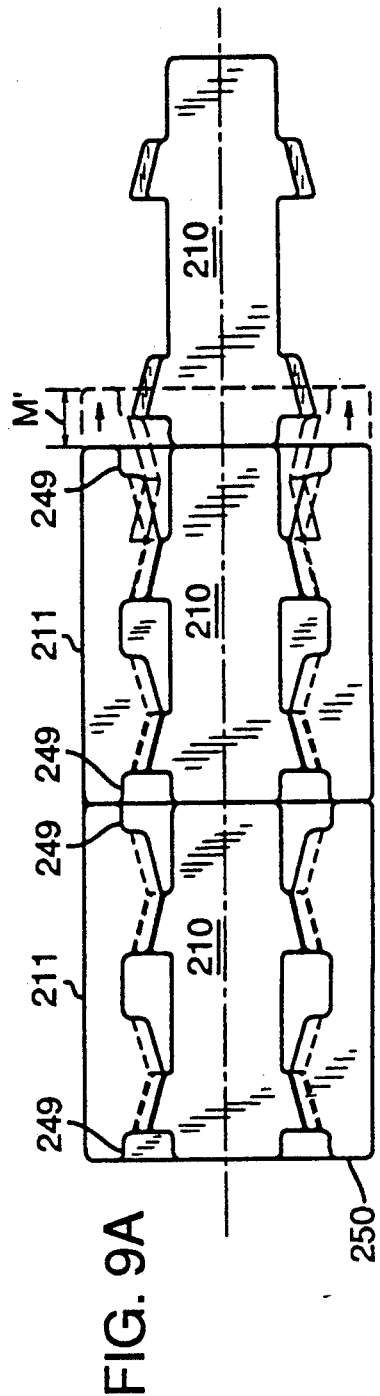
FIG. 9A is a schematic top plan view of the construction of FIG. 6, illustrating disassembly thereof.

This is because the base 10 in FIG. 9 allows the wear element 11 to move the necessary distance M forward to disengage without blocking its movement with any necessary placement of base dovetails. However, to serially employ the embodiment of FIG. 5, end projections are added as at 249 and 250 on the wear element 211 of FIGS. 6 and 7. FIG. 9A shows this version with end projections and the movement M' need to disengage dovetails and remove the wear element.

While in the foregoing specification a detailed description of the invention has been set down for the purpose of illustration, many variations in the details hereingiven may be made by those skilled in the art without departing from the spirit and scope of the invention.

I claim:

1. A replaceable wear element for installation on the wearable part of a structure engageable with abrasive material comprising:

a unitary relatively elongated, generally rectangular plate-like body having end and sidewalls and top and bottom surfaces, one of said surfaces being adapted to engage said abrasive material, the other of said top and bottom surfaces being adapted to be positioned in confronting relation to said wearable part by movement along its longitudinal centerline, said other surface adjacent both sidewalls being equipped with transversely-spaced, integral outstanding portions providing confronting walls, said confronting walls being mirror images and spaced equally away from said longitudinal centerline, a pair of substantially identical, transversely aligned notches in said confronting walls intermediate the ends of said body, each notch being flanked at both longitudinal ends thereof by a flanking segment of said confronting wall, each of said flanking elements being convergently related to said longitudinal centerline in proceeding away from its associated notch, each confronting wall remote from said notch having two additional segments for cooperation with said flanking segments in reversibly mounting said body on said wearable part, all said notches and segments having approximately the same length, a first of said additional segments being spaced approximately two lengths from a first of said flanking segments and the second of said additional segments being spaced approximately two lengths from the second of said flanking segments with said first flanking and additional segments being parallel and second flanking and additional segments being parallel, and each of said confronting wall segments being sloped transversely toward said one surface and its adjacent side wall.

2. The wear element of claim 1 in which said body has a single notch in each wall, said additional segments being on opposite sides of said notch.

3. The wear element of claim 1 in which said body has a second notch in each wall, said additional segments both being on the same side of the first-mentioned notch.

4. The wear element of claim 1 in which said body adjacent one sidewall is extended transversely to position said sidewalls symmetrically relative to said longitudinal centerline.

5. The wear element of claim 4 in which the extended portion of said body is generally arcuate.

6. A replaceable wear element for installation on the wearable part of a structure engageable with abrasive material comprising:

a unitary relatively elongated, generally rectangular plate-like body having end and sidewalls and top and bottom surfaces, one of said surfaces being adapted to engage said abrasive material, the other of said top and bottom surfaces being adapted to be positioned in confronting relation to said wearable part by movement along its longitudinal centerline, said other surface adjacent both sidewalls being equipped with transversely spaced integral outstanding portions providing confronting walls, said confronting walls being mirror images and spaced equally away from said longitudinal centerline, two pairs of substantially identical, transversely aligned notches in said confronting walls intermediate the ends of said body, each notch being flanked at both longitudinal ends thereof by a flanking segment of said confronting walls, each of said flanking segments being convergently related to said longitudinal centerline in proceeding away from its associated notch and, each of said confronting wall segments being sloped transversely toward said one surface and its adjacent sidewall.

7. A replaceable wear element for installation on the wearable part of a structure engageable with abrasive material comprising:

a unitary relatively elongated, generally rectangular plate-like body having end and sidewalls and top and bottom surfaces, one of said surfaces being adapted to engage said abrasive material, the other of said top and bottom surfaces being adapted to be positioned in confronting relation to said wearable part by movement along its longitudinal centerline, said other surface adjacent both sidewalls being equipped with transversely spaced integral outstanding portions providing opposed walls, said opposed walls being arranged in two longitudinally spaced pairs separated by a notch in each wall, said opposed walls being sloped transversely toward said one surface, parts of the opposed walls in one pair being longitudinally aligned with corresponding parts of the opposed walls in the other pair, corresponding parts of the opposed walls in each pair being transversely aligned and spaced equally away from said longitudinal centerline, each wall of each pair including two angularly related wall segments, the wall segment immediately adjacent said notch being convergently related to its transversely aligned wall segment with the wall segment spaced from said notch being divergently related to its transversely aligned wall segment, and said plate-like body terminating a spaced distance from said opposed walls to protect a cooperating base element secured to said wearable portion.

8. An assembly of wear elements for installation on the wearable part of a structure engageable with abrasive material comprising:

a relatively elongated base element adapted to be secured to said wearable part and a relatively elongated wear element releasably, reversibly mounted on said base element along the longitudinal centerlines thereof, each of said base and wear elements having first and second pairs of longitudinally spaced-apart dovetail surfaces with the surfaces in each pair being spaced symmetrically about the centerline thereof, one of said base and wear elements having third and fourth pairs of longitudinally spaced-apart dovetail surfaces with the surfaces in each pair being spaced symmetrically about the centerline thereof, the dovetail surfaces of said third and fourth pairs being interlaced with the dovetail surfaces of said first and second pairs, the dovetail surfaces of the first and second pairs extending at a predetermined angle with said one element centerline and the dovetail surfaces of said third and fourth pairs extending at the reverse of said predetermined angle whereby the first and second pairs of surfaces of the other of said elements can mate with either the first and second pairs of surfaces of said one element or, when reversed end-for-end, with the third and fourth pairs of surfaces of said one element.

9. The assembly of claim 8 in which said base element is a plate-like body having transversely extending flanges equipped with said dovetail surfaces.

10. The assembly of claim 8 in which said wear element is a plate-like body having integral outstanding portions providing confronting walls, said confronting walls being mirror images and spaced equally away from said longitudinal centerline, two pairs of substantially identical, transversely aligned notches in said confronting walls intermediate the ends of said body, each notch being flanked at both longitudinal ends thereof by a segment of said confronting wall, each of said flanking segments being convergently related to said longitudinal centerline in proceeding away from its associated notch.

* * * * *